(12) United States Patent
Ooba

(10) Patent No.: US 9,760,320 B2
(45) Date of Patent: Sep. 12, 2017

(54) PRINT CONTROL APPARATUS, PRINTING SYSTEM, METHOD FOR CONTROLLING PRINT CONTROL APPARATUS, AND STORAGE MEDIUM

(71) Applicant: CANON KABUSHIKI KAISHA, Tokyo (JP)

(72) Inventor: Hideaki Ooba, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/531,617

(22) Filed: Nov. 3, 2014

(65) Prior Publication Data

US 2015/0055181 A1 Feb. 26, 2015

Related U.S. Application Data

(63) Continuation of application No. 13/767,753, filed on Feb. 14, 2013, now Pat. No. 8,902,448.

(30) Foreign Application Priority Data

Feb. 17, 2012 (JP) .................................. 2012-032433

(51) Int. Cl.
| | | |
|---|---|---|
| G06F 1/32 | (2006.01) |
| G06F 3/12 | (2006.01) |
| H04N 1/00 | (2006.01) |
| G06K 15/00 | (2006.01) |

(52) U.S. Cl.
CPC ............ *G06F 3/1221* (2013.01); *G06F 3/121* (2013.01); *G06F 3/1236* (2013.01); *G06F 3/1285* (2013.01); *G06F 3/1286* (2013.01); *H04N 1/00222* (2013.01); *H04N 1/00928* (2013.01); *H04N 2201/0039* (2013.01); *H04N 2201/0041* (2013.01); *H04N 2201/0062* (2013.01); *H04N 2201/0074* (2013.01); *Y02B 60/1271* (2013.01)

(58) Field of Classification Search
CPC ................. G06F 3/1229; G06F 3/1221; G06F 3/1285–3/1288; G06F 9/442; G06F 1/3246; G06F 1/3203; G06F 1/3215; G06F 1/3287; G03G 15/5004; H04N 1/00891; H04N 1/00928; H04L 12/12
USPC ...... 358/1.11–1.18, 1.1; 399/8, 88; 713/300, 713/310, 320–324, 330, 340; 709/207–211
See application file for complete search history.

(56) References Cited

U.S. PATENT DOCUMENTS

| | | | |
|---|---|---|---|
| 6,509,975 B1 * | 1/2003 | Motegi .......................... | 358/1.14 |
| 8,031,350 B2 | 10/2011 | Ohara | |
| 2003/0191975 A1 * | 10/2003 | Kohara .................. | G06F 1/3203 713/300 |
| 2004/0215759 A1 * | 10/2004 | Takahashi et al. ........... | 709/223 |

(Continued)

FOREIGN PATENT DOCUMENTS

| | | |
|---|---|---|
| CN | 1449924 A | 10/2003 |
| CN | 1575449 A | 2/2005 |

(Continued)

*Primary Examiner* — Chad Dickerson
(74) *Attorney, Agent, or Firm* — Canon U.S.A., Inc. IP Division

(57) ABSTRACT

The present invention relates to a print control apparatus that is connected to a data processing apparatus through a first communication unit and connected to an image forming apparatus through a second communication unit.

4 Claims, 14 Drawing Sheets

(56) References Cited

U.S. PATENT DOCUMENTS

| | | | | |
|---|---|---|---|---|
| 2004/0258444 A1* | 12/2004 | Okada | ............... | G06K 15/1803 400/76 |
| 2005/0123109 A1* | 6/2005 | Yamagishi | .............. | H04L 12/12 379/102.01 |
| 2009/0276643 A1* | 11/2009 | Saito | ........................ | G06F 1/30 713/300 |
| 2011/0007339 A1* | 1/2011 | Negishi | ................ | G06F 3/1221 358/1.14 |
| 2011/0261405 A1* | 10/2011 | Ito et al. | ...................... | 358/1.15 |
| 2012/0162709 A1* | 6/2012 | Watanabe et al. | ........... | 358/1.15 |
| 2013/0215466 A1* | 8/2013 | Ooba | ........................... | 358/1.15 |
| 2013/0222841 A1* | 8/2013 | Masuyama | .................. | 358/1.14 |
| 2014/0185081 A1* | 7/2014 | Kikuchi | ...................... | 358/1.14 |

FOREIGN PATENT DOCUMENTS

| | | | |
|---|---|---|---|
| JP | 2000010670 A | 1/2000 |
| JP | 2001202162 A | 7/2001 |
| JP | 2002312076 A | 10/2002 |
| JP | 2003303075 A | 10/2003 |
| JP | 2005175625 A | 6/2005 |
| JP | 2011016284 A | 1/2011 |
| JP | 2011114806 A | 6/2011 |
| WO | 03/036459 A1 | 5/2003 |

\* cited by examiner

FIG.10

| SOCKET | LAST TRANSFER TIME (ms) | CONNECTION START TIME |
|---|---|---|
| 1 | 300 | 2022/10/5 12:55 |
| 2 | 5 | 2022/10/5 10:55 |
| 3 | 10000 | 2022/10/4 10:12 |
| 4 | 3 | 2022/10/5 11:34 |
| 5 | 1 | 2022/10/5 17:35 |

PRINT CONTROL APPARATUS, PRINTING SYSTEM, METHOD FOR CONTROLLING PRINT CONTROL APPARATUS, AND STORAGE MEDIUM

CROSS REFERENCE TO RELATED APPLICATIONS

The present application is a divisional of U.S. patent application Ser. No. 13/767,753, filed Feb. 14, 2013, entitled "PRINT CONTROL APPARATUS, PRINTING SYSTEM, METHOD FOR CONTROLLING PRINT CONTROL APPARATUS, AND STORAGE MEDIUM", the content of which is expressly incorporated by reference herein in its entirety. Further, the present application claims priority from Japanese Patent Application No. 2012-032433 filed Feb. 17, 2012, which is hereby incorporated by reference herein in its entirety.

BACKGROUND OF THE INVENTION

Field of the Invention

The present invention relates to a print control apparatus which communicates with a data processing apparatus (information processing apparatus) and an image forming apparatus (printing apparatus) to control print processing, a printing system, a method for controlling a print control apparatus, and a storage medium.

Description of the Related Art

In conventionally known systems, an image forming apparatus with a print control apparatus has been terminated by manually performing end processing on both the print control apparatus and the image forming apparatus so that the apparatuses individually perform shutdown processing. Depending on the system of the print control apparatus, the image forming apparatus may need to be powered on in the meantime.

In such systems, the power supply of the print control apparatus is interlocked with the power supply system of the image forming apparatus so that when the end processing of the image forming apparatus is manually performed, the print control apparatus is also terminated in a synchronous manner. If the image forming apparatus powers off the print control apparatus in a synchronous manner without checking the state of the print control apparatus, the print control apparatus may still be accessing a hard disk. This can cause a failure of the hard disk.

Japanese Patent Application Laid-Open No. 2007-36318 discusses a method that can solve the foregoing problem. According to the method, in a system where power supplies are terminated in a synchronous manner, an apparatus checks the status of access to a hard disk by another apparatus and performs end processing on the power supplies in a synchronous manner only if no hard disk access is being made. A system has also been provided where an image forming apparatus is terminated not by manual end processing but by a remote end from another data processing apparatus on a network.

Problems of a printing system in which a print control apparatus and an image forming apparatus are connected to each other and the print control apparatus communicates with a data processing apparatus through a network will be described below with reference to sequence examples illustrated in FIGS. 13 and 14. Steps S1301 and S1401 to S1403 represent notifications or instructions.

As illustrated in the sequence example of FIG. 13, a problem can occur when a data processing apparatus (information processing apparatus) 211 performs a remote end of the system of an image forming apparatus (i.e., printing apparatus) 207 to which a print control apparatus 201 is connected. In step S1301, the data processing apparatus 211 issues a remote end instruction. In such a system, the remote end instruction can only power off the print control apparatus 201, failing to simultaneously power off the image forming apparatus 207.

When a power supply state of the image forming apparatus 207 is changed, the power supply state of the image forming apparatus 207 needs to be notified to the data processing apparatus 211 on a local area network (LAN).

As illustrated in the sequence example of FIG. 14, in step S1401, the print control apparatus 201 receives a power supply state notification from the image forming apparatus 207. In step S1402, the print control apparatus 201 transfers the power supply state notification (step S1401) to the data processing apparatus 211.

When the print control apparatus 201 is powered off, in step S1403, the image forming apparatus 207 then transmits a power supply state notification. The print control apparatus 201 cannot receive or transfer the power supply state notification to the data processing apparatus 211. This leads to a problem that the data processing apparatus 211 cannot properly manage the power supply state of the image forming apparatus 207.

The foregoing two problems also occur when the image forming apparatus 207 and the connected print control apparatus 201 both perform a remote end in a synchronous manner according to a remote end instruction from the data processing apparatus 211.

SUMMARY OF THE INVENTION

The present invention is directed to a print control apparatus and a printing system capable of performing a remote end of a print control apparatus and an image forming apparatus in a synchronous manner even if the remote end is performed according to an instruction from a data processing apparatus, and by which the print control apparatus can transfer a power supply state notification transmitted from the image forming apparatus to a LAN without fail.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 is a table illustrating a relationship between last transfer time and a connection start time of Sockets.

DESCRIPTION OF THE EMBODIMENTS

Various exemplary embodiments, features, and aspects of the invention will be described in detail below with reference to the drawings.

<System Configuration>

Figure 1:
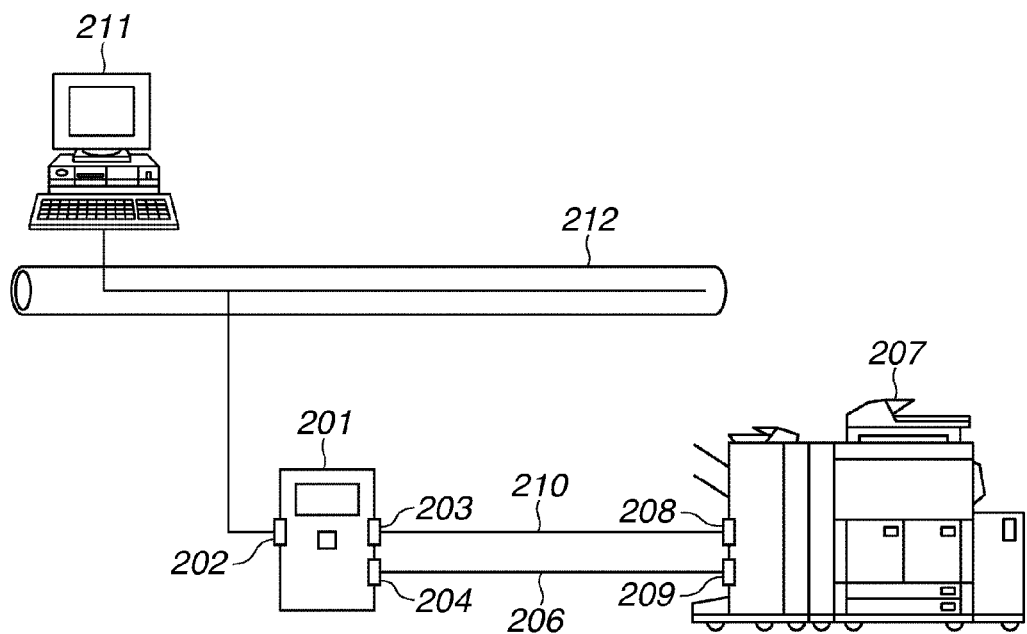
FIG. 1 is a diagram illustrating a configuration of a printing system according to an exemplary embodiment of the present invention.

FIG. 1 is a diagram illustrating a configuration of a printing system according to a first exemplary embodiment of the present invention. The present exemplary embodiment deals with an example of a print control apparatus that is connected to a data processing apparatus through a first communication unit and connected to an image forming apparatus (printing apparatus) through a second communication unit. As employed herein, the first communication unit corresponds to a network (LAN) 212. The second communication unit corresponds to a dedicated transmission path 206.

In FIG. 1, a data processing apparatus (information processing apparatus) 211 is communicably connected to a print control apparatus 201 through the LAN 212 and a connector 202. An image forming apparatus (printing apparatus) 207 is connected to the print control apparatus 201 through a connector 208 and a local LAN 210. The dedicated transmission path 206 is connected between a connector 209 of the image forming apparatus 207 and a connector 204 of the print control apparatus 201.

Figure 2:
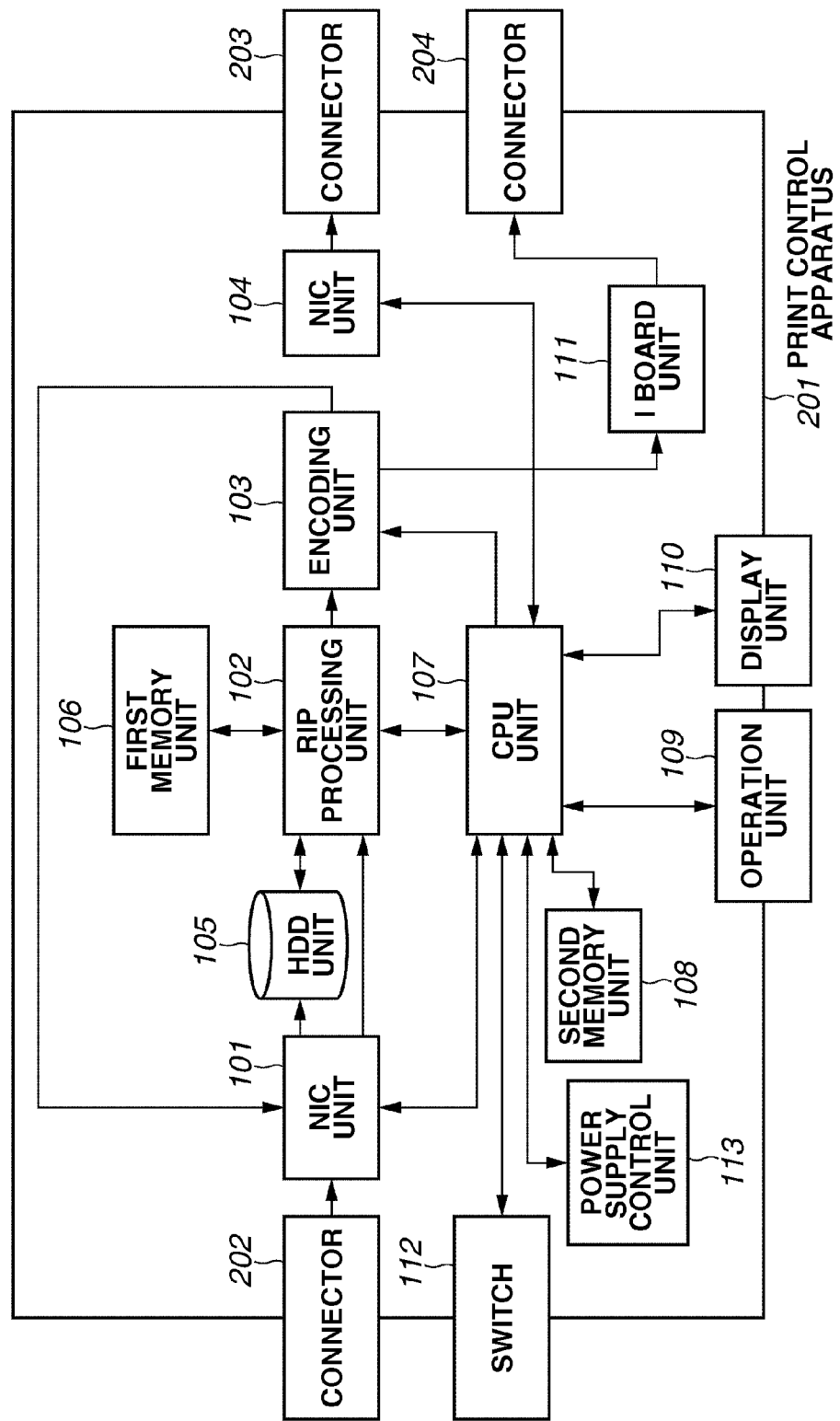
FIG. 2 is a block diagram illustrating a schematic configuration example of the print control apparatus illustrated in FIG. 1.

FIG. 2 is a block diagram illustrating a schematic configuration example of the print control apparatus 201 illustrated in FIG. 1.

In FIG. 2, a network interface card (NIC) unit 101 functions as a first communication unit interface which controls a low layer level connection with the LAN 121 illustrated in FIG. 1.

A raster image processor (RIP) processing unit 102 processes a received print language such as a page description language (PDL) or a certain data format (compressed by Joint Bi-level Image Experts Group (JBIG)) into a raster image. An encoding unit 103 converts the raster image data into a form of print data or a data format supported by the image forming apparatus 207. A NIC unit 104 functions as a second communication unit interface that controls a low layer level connection.

A hard disk drive (HDD) unit 105 temporarily stores (spools) print data received by the NIC unit 101, or temporarily stores RIP-processed compressed data. The RIP processing unit 102 uses a first memory unit 106 for image rasterization processing. A central processing unit (CPU) unit 107 controls the entire print control apparatus 201.

The CPU unit 107 uses a second memory unit 108 as a temporary data storage area. An operation unit 109 includes buttons, keys, and/or a touch panel. The operation unit 109 is intended to operate the print control apparatus 201. A display unit 110 displays information to the operator by using images and/or characters.

An image interface board (I board) unit 111 is connected to the connector 204 for an interface. The I board unit 111 and the connector 204 are used to form the dedicated transmission path 206 to transfer image data. A switch 112 accepts user's power-off and power-on operations. When the switch 112 is operated, the CPU unit 107 is interrupted.

Detecting the interrupt, the CPU unit 107 controls a power supply control unit 113 according to a processing state. Data packets from the data processing apparatus 211 to the print control apparatus 201 pass through the LAN 212 and taken into the print control apparatus 201 through the connector 202 and the LAN 212. In the print control apparatus 201, the NIC unit 101 performs data reception processing.

Receiving print data from the data processing apparatus 211, the NIC unit 101 writes the received print data into the HDD unit 105, if needed, according to a control of the CPU unit 107. Such an operation is referred to as queuing (spooling) which is commonly performed for the purpose of improving data transfer speed. The received print data stored in the HDD unit 105 is read from the RIP processing unit 102 according to an instruction from the CPU unit 107.

Not-queued print data is directly transferred to the RIP processing unit 102 according to an instruction from the CPU unit 107. The RIP processing unit 102 processes the transmitted print data into a raster image.

The encoding unit 103 performs data form conversion function processing. The encoding unit 103 performs encoding into a data form interpretable by the image forming apparatus 207 based on a preset data form or forms interpretable by the image forming apparatus 207 and the form of the received data. Such encoding processing is performed according to need. The encoding processing may be skipped if encoding is not needed when the received input data is already in a form interpretable by the image forming apparatus 207.

The encoded data needs to be in a form interpretable by the image forming apparatus 207. Such a form varies depending on the capabilities of an interpretation unit built in the image forming apparatus 207. Examples of the capabilities include a certain print language form and a data format compressed by a certain method such as JBIG.

To transmit the data encoded according to need to the LAN 210, the NIC unit 104 converts the data into data packets again. The data packets are transmitted from the connector 203 to the image forming apparatus 207 through the LAN 210 and the connector 208.

Receiving the data packets, the image forming apparatus 207 performs print processing on a recording medium such as a sheet according to its own print processing procedure. Another data transfer method includes transferring data to the image interface board unit 111 through the encoding unit 103, and transmitting the data to the image forming apparatus 207 through the connector 204, the dedicated transmission path 206, and the connector 209.

To transmit data packets to the print control apparatus 201 in such a manner, the data processing apparatus 211 needs to acquire on a timely basis the power supply states of the print control apparatus 201 and the image forming apparatus 207 and the states about whether the print control apparatus 201 and the image forming apparatus 207 are in a normal activation state.

For that purpose, the data processing apparatus 211 performs polling to acquire the states at regular time intervals, or acquires state change notification packets transmitted from the print control apparatus 201 and the image forming apparatus 207. The data processing apparatus 211 then changes its processing accordingly.

For example, the image forming apparatus 207 may transmit a power supply state notification packet at power-off. Receiving the power supply state notification packet, the data processing apparatus 211 can quit polling to avoid unnecessary traffic on the network 212.

Figure 3:
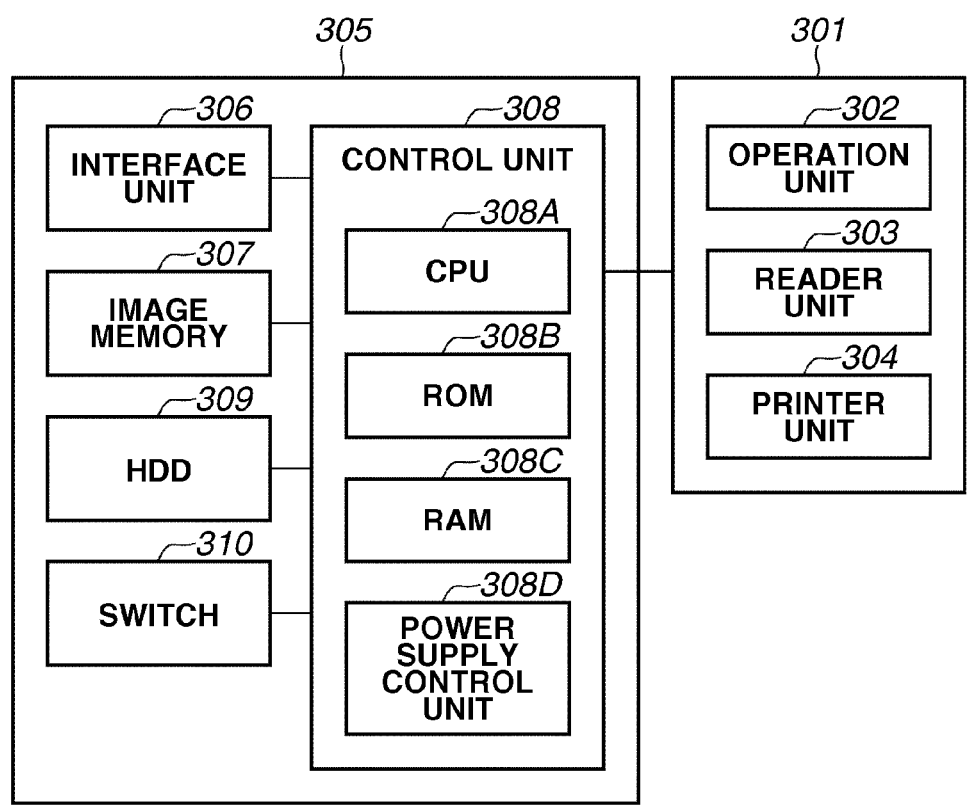
FIG. 3 is a block diagram illustrating a configuration of the image forming apparatus (printing apparatus) illustrated in FIG. 1.

FIG. 3 is a block diagram illustrating a configuration of the image forming apparatus 207 illustrated in FIG. 1.

In FIG. 3, the image forming apparatus 207 according to the present exemplary embodiment includes an image forming apparatus main body 301 and an image input/output control unit 305. The image forming apparatus main body 301 includes an operation unit 302, a reader unit 303, and a printer unit 304.

The operation unit 302 is used to operate the image forming apparatus main body 301 and the image input/output control unit 305. The reader unit 303 reads a document image and outputs image data corresponding to the document image to the printer unit 304 and the image input/output control unit 305. The printer unit 304 records an image according to image data from the reader unit 303 and/or the image input/output control unit 305 on a recording sheet.

The image input/output control unit 305 is connected to the reader unit 303. The image input/output control unit 305 includes an interface unit 306, an image memory 307, a control unit 308, and a hard disk (HDD) 309. The HDD 309 stores settings of the image forming apparatus 207 (for example, an address book, operation history, user settings, ID settings, and network settings).

The interface unit 306 is an interface between the control unit 308 and the print control apparatus 201, and between the control unit 308 and the data processing apparatus 211 on the network 212. The interface unit 306 receives code data describing an image transferred from the print control apparatus 201 through the connector 209, rasterizes the received data into image data recordable by the printer unit 304, and passes the image data to the control unit 308.

The interface unit 306 receives code data describing image data transferred from the data processing apparatus 211 through the connector 208. An example of the connector 208 is an Ethernet (registered trademark) connector.

If the data received from the data processing apparatus 211 needs to be rasterized into data recordable by the printer unit 304, the interface unit 306 rasterizes the data and passes the rasterized data to the control unit 308. The connector 209 may be configured as a network interface and connected to the print control apparatus 201 through a network.

The connector 209 may be configured as a parallel interface or a Universal Serial Bus (USB) interface, and directly connected to the print control apparatus 201 through an interface cable. A plurality of cables may be used instead of a single cable.

The control unit 308 includes a CPU 308A, a read-only memory (ROM) 308B, a random access memory (RAM) 308C, and a power supply control unit 308D. The CPU 308A of the control unit 308 loads a program stored in the ROM 308B or other storage medium into the RAM 308C and executes the program. The program controls a data flow between the reader unit 303, the interface unit 306, and the image memory 307.

The HDD 309 may be replaced by other nonvolatile memories whose data will not disappear even after power-off, and the image input/output control unit 305 may be configured to store data in such nonvolatile memories.

A switch 310 accepts user's power-off and power-on operations. When the switch 310 is operated, the control unit 308 receives an interrupt. Detecting the interrupt, the CPU 308A of the control unit 308 controls the power supply control unit 308D according to conditions.

Figure 4:
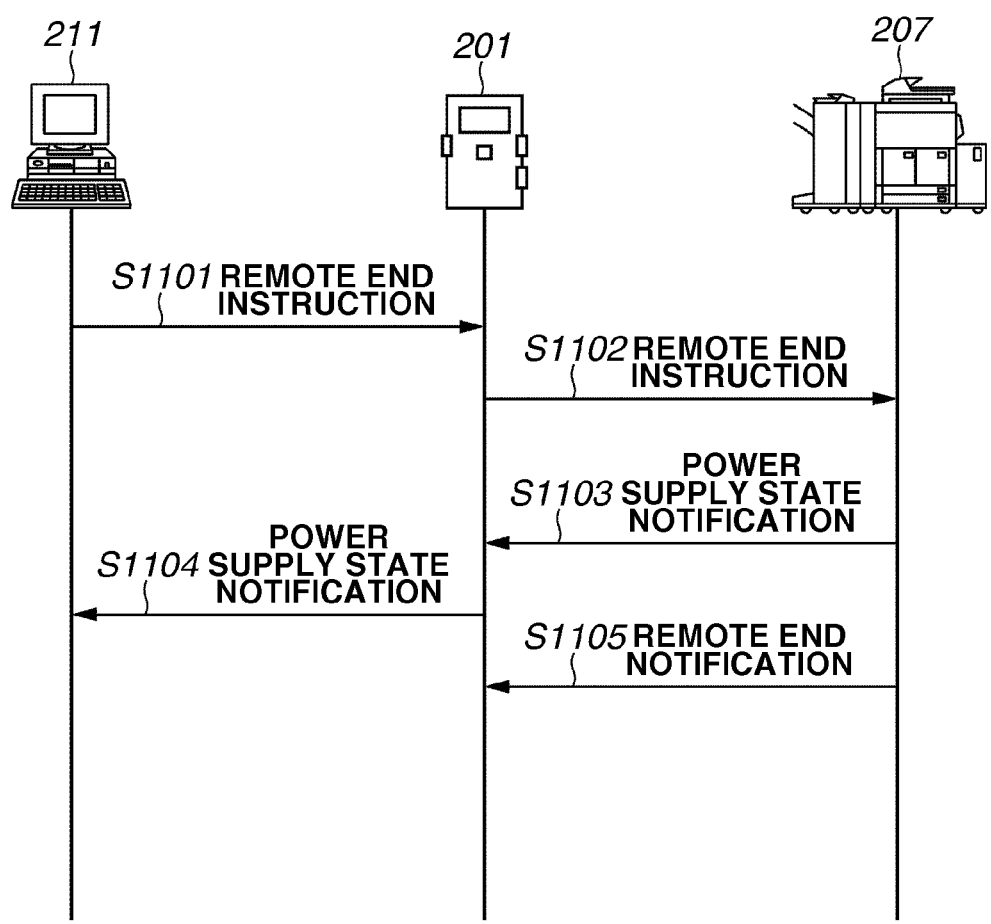
FIG. 4 is a diagram illustrating a first power supply control sequence example of the printing system according to the present exemplary embodiment.

FIG. 4 is a diagram illustrating a first sequence example of the printing system according to the present exemplary embodiment. Steps S1101 to S1105 represent instructions or notifications.

In step S1101 of FIG. 4, the data processing apparatus 211 issues a remote end instruction to the print control apparatus 201. In step S1102, the print control apparatus 201 receives the remote end instruction, and issues a remote end instruction to the image forming apparatus 207. In step S1103, the image forming apparatus 207 receives the remote end instruction, starts remote end processing of the image forming apparatus 207, and transmits a power supply state notification to the data processing apparatus 211. In step S1104, the print control apparatus 201 receives the power supply state notification, and transmits the power supply state notification to the data processing apparatus 211. In step S1105, the image forming apparatus 207 transfers a remote end notification to the print control apparatus 201.

Transmitting the remote end notification, the image forming apparatus 207 turns off the switch 310 of the image forming apparatus 207. In step S1105, the print control apparatus 201 receives the remote end notification, and powers off itself.

As a sequence example of the present exemplary embodiment, flowcharts of the print control apparatus 201 and the image forming apparatus 207 will be described below with reference to FIGS. 4 and 5.

Figure 5:
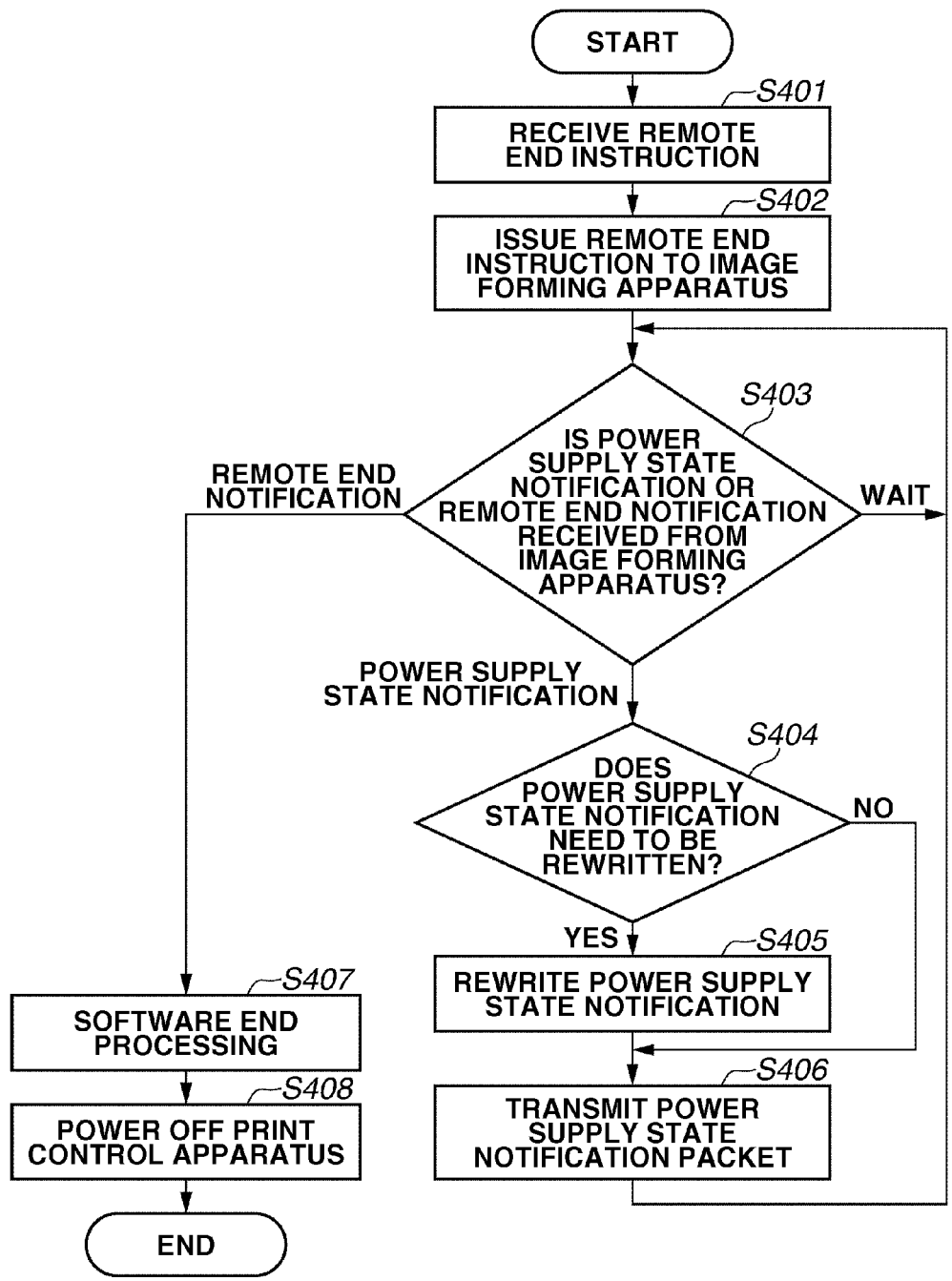
FIG. 5 is a flowchart illustrating a method for controlling the print control apparatus according to the present exemplary embodiment.

FIG. 5 is a flowchart illustrating a method for controlling the print control apparatus 201 according to the present exemplary embodiment. This example deals with an example of processing between when the data processing apparatus 211 transmits a remote end instruction to the print control apparatus 201 and the print control apparatus 201 receives the instruction and when the print control apparatus 201 is powered off. The following steps are executed and implemented by the CPU unit 107 of the print control apparatus 201 according to programs stored in the first memory unit 106 and the second memory unit 108.

In step S401, the CPU unit 107 receives a remote end instruction from the data processing apparatus 211 that is connected with the LAN 212 (step S1101 of FIG. 4). The remote end instruction may be issued in any form as long as a communicable protocol is used between the data processing apparatus 211 and the print control apparatus 201.

In the present exemplary embodiment, the data processing apparatus 211 uses the Simple Network Management Protocol (SNMP) to set (SetRequest) the remote end instruction into a management information base (MIB) object that can instruct a remote end of the print control apparatus 201. When the CPU unit 107 detects that a remote end instruction to the image forming apparatus 207 is issued and written into the MIB object, the processing proceeds to step S402. In step S402, the CPU unit 107 issues a remote end instruction to the image forming apparatus 207 (step S1102 of FIG. 4).

The remote end instruction from the print control apparatus 201 is also issued by using MIB. The print control apparatus 201 sets (SetRequest) the remove end instruction into a MIB object that can instruct a remote end of the image forming apparatus 207, and the processing proceeds to step S403.

In step S403, the CPU unit 107 waits for a power supply state notification and a remote end notification of the image forming apparatus 207, transmitted from the image forming apparatus 207 (step S1103 of FIG. 4). Since the CPU unit 107 waits for the processing of the image forming apparatus 207, a description will be shifted from the flow of the print control apparatus 201 illustrated in FIG. 5 to that of the image forming apparatus 207 illustrated in FIG. 6.

Figure 6:
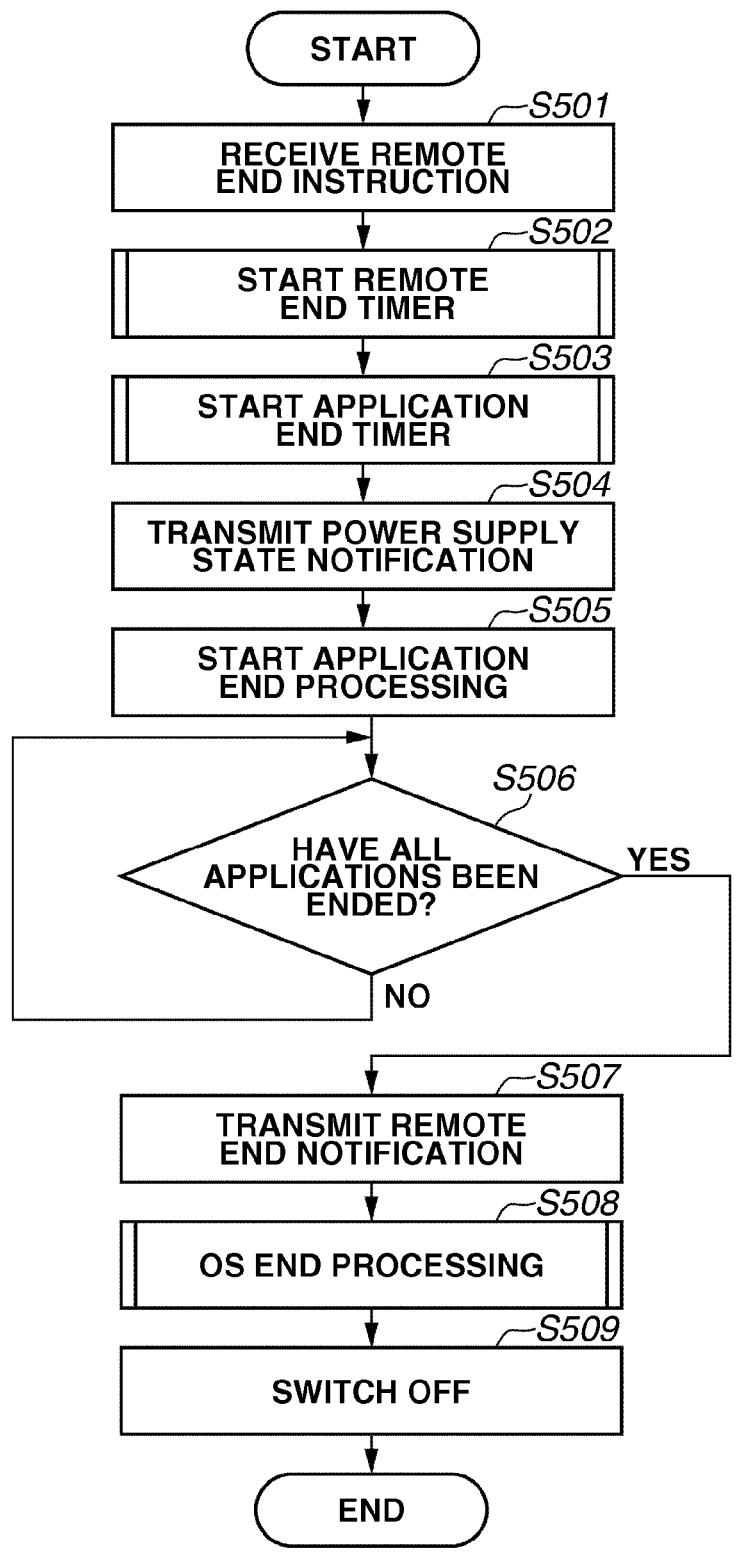
FIG. 6 is a flowchart illustrating a method for controlling the image forming apparatus according to the present exemplary embodiment.

FIG. 6 is a flowchart illustrating a method for controlling the image forming apparatus 207 according to the present exemplary embodiment. This example deals with an example of remote end processing of the image forming apparatus 207. The following steps are executed and implemented by the CPU 308A of the control unit 308 of the image forming apparatus 207 according to a program stored in the ROM 308B of the control unit 308.

In step S501, when the print control apparatus 201 sets (SetRequest) a remote end instruction to the image forming apparatus 207 into a MIB object, the processing proceeds to step S502. In step S502, the CPU 308A of the image forming apparatus 207 starts a remote end timer, and the processing proceeds to step S503. In step S503, the CPU 308A starts an application end timer, and the processing proceeds to step S504. The timer-related processing will be described below.

In step S504, the CPU 308A transmits a power supply state notification to the LAN 210 so that the image forming apparatus 207 notifies the data processing apparatus 211 on the LAN 212 of a change of the power supply state (step S1103 of FIG. 4). The CPU 308A transmits the power supply state notification at a startup time when the image forming apparatus 207 is powered on, at an end time when the image forming apparatus 207 is powered off, and when the image forming apparatus 207 changes to a different state like an idle state.

In step S504, the power supply state notification includes an attribute value indicating a power-off since the image forming apparatus 207 is going to be powered off.

In step S505, the CPU 308A of the image forming apparatus 207 transmits an end notification to applications in the image forming apparatus 207, and the processing proceeds to step S506. In step S506, the CPU 308A waits until the applications in the image forming apparatus 207 complete end processing. If all the applications are determined to have been ended (YES in step S506), the processing proceeds to step S507.

In step S507, the CPU 308A of the image forming apparatus 207 transmits a remote end notification to the print control apparatus 201 (step S1105 of FIG. 4), and the processing proceeds to step S508. In step S508, the CPU 308A of the image forming apparatus 207 performs operating system (OS) end processing, and the processing proceeds to step S509. In step S509, the CPU 308A of the image forming apparatus 207 turns off the switch 310, whereby the power supply to the image forming apparatus 207 is disconnected.

The timer-related processing in the foregoing steps S502 and S503 will be described below.

First, the application end timer set in step S503 will be described.

In step S506, the image forming apparatus 207 is described to wait for the applications to end. However, an application may fail to end for some reason. In such a case, no end notification comes from the application. The application end timer is used to enable a remote end even in such a case.

Figure 7:
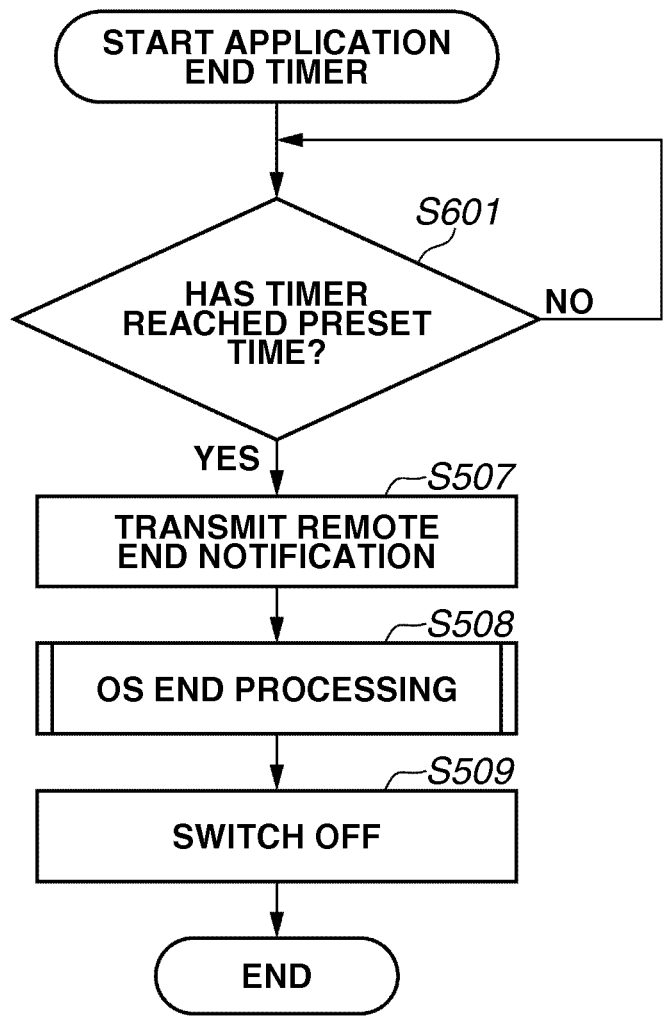
FIG. 7 is a flowchart illustrating a method for controlling the image forming apparatus according to the present exemplary embodiment.

FIG. 7 is a flowchart illustrating a method for controlling the image forming apparatus 207 according to the present exemplary embodiment. This example deals with an example of power switch control by the application end timer. The following steps are executed and implemented by the CPU 308A of the control unit 308 of the image forming apparatus 207 according to a program stored in the ROM 308B of the control unit 308.

In step S503 illustrated in FIG. 6, the CPU 308A starts the application end timer, and then, the processing proceeds to step S601.

In step S601, the CPU 308A determines whether the application end timer has reached a preset time. If the CPU 308A determines that the application end timer has not yet reached the preset time (NO in step S601), the CPU 308A continues to wait for the lapse of the preset time.

On the other hand, in step S601, if the CPU 308A determines that the application end timer has reached the preset time (YES in step S601), then in step S506, the CPU 308A interrupts the loop for waiting for the applications to end, and the processing proceeds to step S507. A description of the processing of steps S507 and the subsequent steps is omitted.

Next, the remote end start timer set in step S502 will be described.

In step S508, the image forming apparatus 207 is described to perform the OS end processing. However, the OS end processing may fail to end an OS for some reason. The remote end timer is used to perform a remote end even in such a case.

Figure 8:
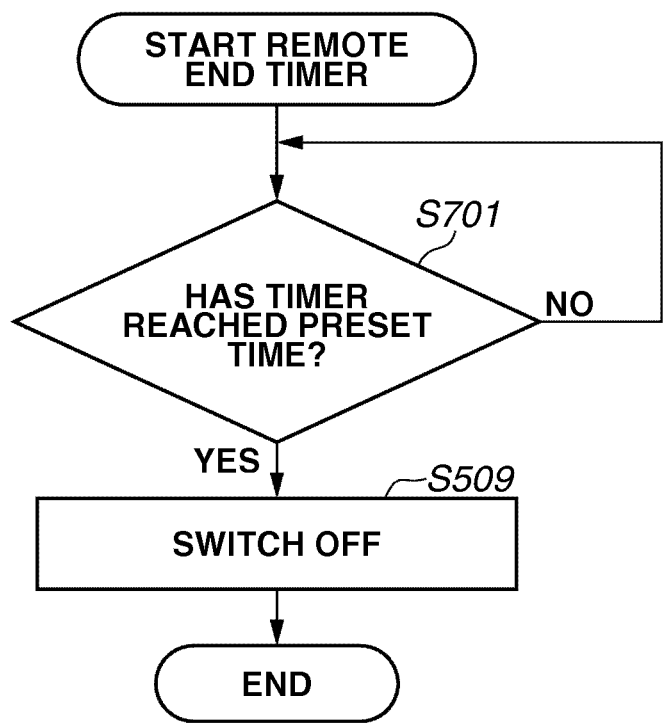
FIG. 8 is a flowchart illustrating a method for controlling the image forming apparatus according to the present exemplary embodiment.

FIG. 8 is a flowchart illustrating a method for controlling the image forming apparatus 207 according to the present exemplary embodiment. This example deals with an example of power switch control by the remote end timer. The following steps are executed and implemented by the CPU 308A of the control unit 308 of the image forming apparatus 207 according to a program stored in the ROM 308B of the control unit 308.

In step S502, the CPU 308A starts the remote end timer. In step S701, the CPU 308A of the control unit 308 determines whether the remote end timer has reached a preset time. If the CPU 308A determines that the remote end timer has not yet reached the preset time (NO in step S701), the 308A continues to wait for the lapse of the preset time.

On the other hand, if the CPU 308A determines that the remote end time has reached the preset time (YES in step S701), the CPU 308A interrupts the OS end processing of step S508, and the processing proceeds to step S509. A description of the processing of step S509 and later is omitted.

The description returns to the flow of the print control apparatus 201 illustrated in FIG. 5.

In step S403, the CPU unit 107 of the print control apparatus 201 waits for a power supply state notification and a remote end notification transmitted from the image forming apparatus 207. If the CPU unit 107 receives a power supply state notification (POWER SUPPLY STATE NOTIFICATION in step S403; step S1103 of FIG. 4), the processing proceeds to step S404.

In step S404, the CPU unit 107 refers to attribute values of the power supply state notification and searches for an attribute value or values that need to be rewritten by an attribute value or values of the print control apparatus 201. As employed herein, an attribute value to be rewritten is that the data processing apparatus 211 becomes incapable of normal processing unless the attribute value of the image forming apparatus 207 is rewritten by that of the print control apparatus 201 when the print control apparatus 201 transfers the power supply state notification to the LAN 212. Examples include an Internet Protocol (IP) address and Media Access Control (MAC) address information.

If, in step S404, the CPU unit 107 determines that the power supply state notification includes such information (YES in step S404), the processing proceeds to step S405. In step S405, the CPU unit 107 rewrites the attribute value or values that need to be rewritten by the attribute value or values of the print control apparatus 201, and the processing proceeds to step S406.

If, in step S404, the CPU unit 107 determines that there is no attribute value to be rewritten (NO in step S404), the processing proceeds to step S406.

In step S406, the CPU unit 107 transmits the resulting power supply state notification packet to the LAN 212 (S1104 of FIG. 4), and the processing proceeds to step S403.

If, in step S403, the CPU unit 107 receives a remote end notification (REMOTE END NOTIFICATION in step S403; step S1105 of FIG. 4), the processing proceeds to step S407.

In step S407, the CPU unit 107 performs software end processing, and the processing proceeds to step S408. In step S408, since a remote end notification has been received from the image forming apparatus 207 in step S403 according to a remote end instruction for disconnecting the power supply, the CPU unit 107 turns off the switch 112. In other words, the CPU unit 107 performs shutdown processing, and ends the present processing. If the switch 112 is a push switch or the like that needs no hardware OFF processing, an explicit OFF operation on the switch 112 is not needed.

As a result, the print control apparatus 201 can restrict the start of the shutdown processing after a power supply state received from the image forming apparatus 207 is notified to the data processing apparatus 211 until a remote end notification is received from the image forming apparatus 207.

Figure 9:
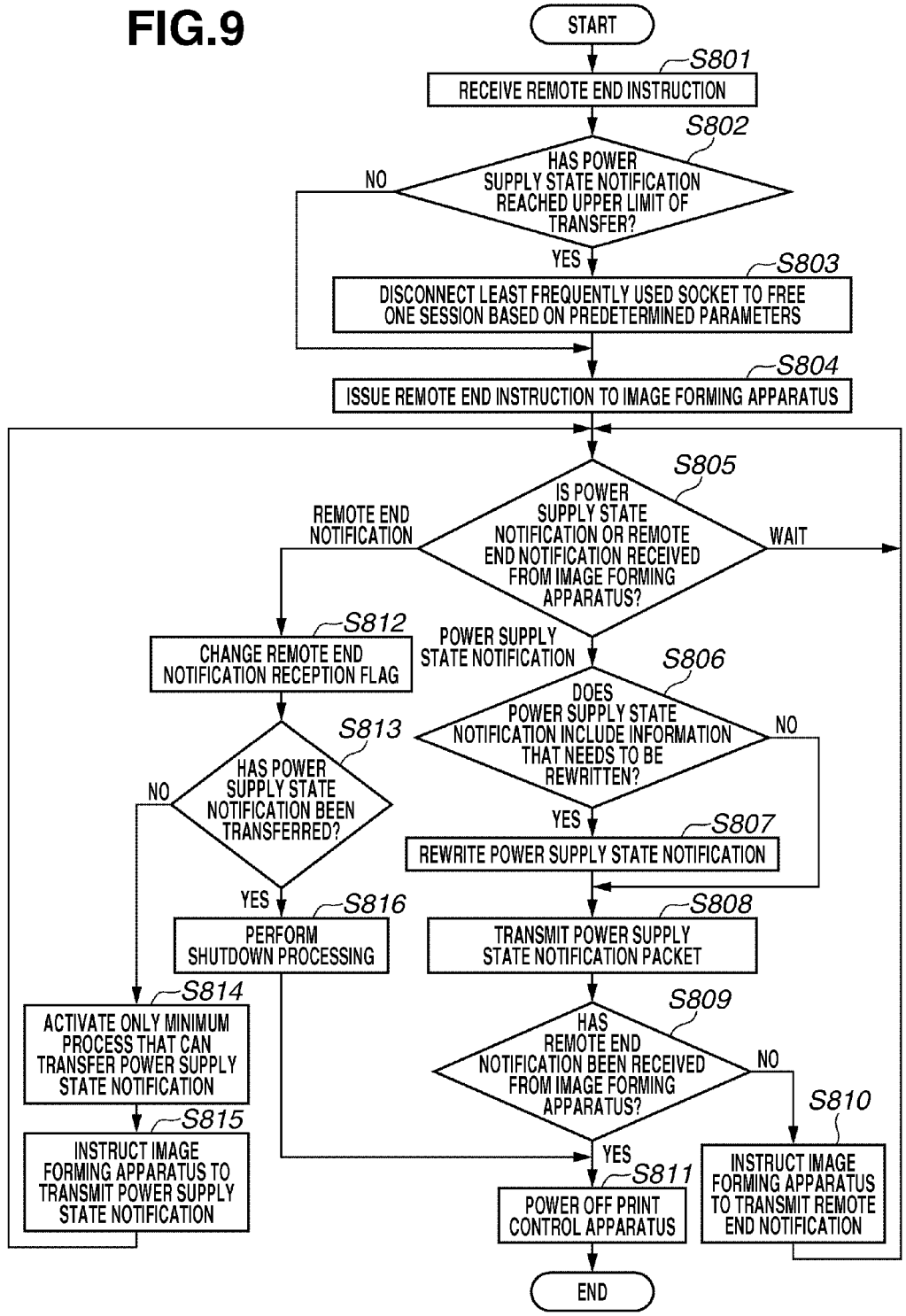
FIG. 9 is a flowchart illustrating a method for controlling a print control apparatus according to a second exemplary embodiment.

FIG. 9 is a flowchart illustrating a method for controlling an image control apparatus according to a second exemplary embodiment. This example deals with an example of processing between when the data processing apparatus 211 transmits a remote end instruction to the print control apparatus 201 and the print control apparatus 201 receives the instruction and when the print control apparatus 201 is powered off. The following steps are executed and implemented by the CPU unit 107 of the print control apparatus 201 according to programs stored in the first memory unit 106 and the second memory unit 108.

A basic flowchart of the image forming apparatus 207 is similar to that of the first exemplary embodiment, and the description thereof is thus omitted. In the flowchart of FIG. 9, the description of steps that perform similar processing to that of FIG. 5 is also omitted where appropriate.

In step S801, when the CPU unit 107 detects that a remote end instruction is written into a MIB object, then the processing proceeds to step S802. In step S802, the CPU unit 107 determines whether a process for transmitting a power supply state notification has reached an upper limit of sockets currently usable. More specifically, the CPU unit 107 determines whether a remote end notification can be transferred to the data processing apparatus 211 based on whether the number of packets transferred to communicate with the data processing apparatus 211 has exceeded an upper limit number.

If the CPU unit 107 determines that the upper limit has been reached (YES in step S802), the processing proceeds to step S803. If the CPU unit 107 determines that the upper limit has not yet been reached (NO in step S802), the processing proceeds to step S804.

In step S803, a process for transferring a power supply state notification of the print control apparatus 201 terminates a socket that is estimated to be currently the least frequently used. The process (communication process) for transferring a power supply state notification identifies the least frequently used socket based on the time at which the last packet was transferred (last transfer time) and the time at which the connection was initiated (connection stat time). In such a manner, the print control apparatus 201 can notify the power supply state of the image forming apparatus 207 to the data processing apparatus 211 while suppressing traffic on the communication interfaces including the network 212 and the transmission path 206.

FIG. 10 is a chart illustrating a relationship between the last transfer time and connection start time of sockets in a certain state.

In the present exemplary embodiment, if the upper limit number of sockets is "5", in the state of FIG. 10, the upper limit number has already been reached. In such a case, the CPU unit 107 selects a socket where the longest time has elapsed since the last transfer. In the example of FIG. 10, socket 3 has the longest last transfer time, and the CPU unit 107 terminates this socket 3. If there are sockets having the same last transfer times, the CPU unit 107 selects and terminates one having an earlier connection start time.

In step S803, the CPU unit 107 terminates a socket, and then the processing proceeds to step S804. In step S804, the print control apparatus 201 issues a remote end instruction to the image forming apparatus 207, and then the processing proceeds to step S805.

In step S805, the CPU unit 107 waits for a power supply state notification and a remote end notification to be transmitted from the image forming apparatus 207. If the CPU unit 107 receives a power supply state notification (POWER SUPPLY STATE NOTIFICATION in step S805), the processing proceeds to step S806. In step S806, the CPU unit 107 refers to attribute values of the power supply state notification and searches for an attribute value or values that need to be rewritten by an attribute value or values of the print control apparatus 201. If the CPU unit 107 determines that there is any attribute value that needs to be rewritten (YES in step S806), the processing proceeds to step S807.

In step S807, the CPU unit 107 rewrites the value or values that need to be rewritten, and the processing proceeds to step S808. If, in step S806, the CPU unit 107 determines that there is no value to be rewritten (NO in step S806), the processing proceeds to step S808.

In step S808, the CPU unit 107 transmits the power supply state notification to the LAN 212. The CPU unit 107 sets on a flag that indicates reception of the power supply state notification, stores the flag into the first memory unit 106, and then the processing proceeds to step S809. In step S809, the CPU unit 107 determines whether the CPU unit 107 has received a remote end notification transmitted from the image forming apparatus 207. Here, the CPU unit 107 acquires a remote end notification reception flag from the first memory unit 106. If the CPU unit 107 determines that no remote end notification has been received (NO in step S809), the processing proceeds to step S810.

If, in step S809, the CPU unit 107 determines that the remote end notification has been received (YES in step S809), the processing proceeds to step S811. In step S811, the CPU unit 107 turns off the switch 112, and ends the present processing.

In step S810, the CPU unit 107 instructs the image forming apparatus 207 to transmit a remote end notification. Receiving the instruction to transmit a remote end notification, the image forming apparatus 207 changes the state of the image forming apparatus 207 into step S507 (FIG. 6) to transmit a remote end notification, and then performs the OS end processing. Having transmitted the instruction to transmit a remote end notification to the image forming apparatus 207 in step S810, the processing proceeds to step S805.

In step S805, if the CPU unit 107 receives a remote end notification (REMOTE END NOTIFICATION in step S805), the processing proceeds to step S812. In step S812, the CPU unit 107 sets on the remote end notification reception flag, stores the remote end notification reception flag into the first memory unit 106, and then the processing proceeds to step S813.

In step S813, the CPU unit 107 determines whether a power supply state notification has been transferred. To determine whether the CPU 308A has received such the packet, the CPU unit 107 checks the flag indicating the reception of a power supply state notification, set in step S808. If the flag is on (YES in step S813), the CPU unit 107 determines that the power supply state notification has been received, and then the processing proceeds to step S816.

In step S816, the CPU unit 107 performs shutdown processing on the print control apparatus 201, and the processing proceeds to step S811.

If, in step S813, the CPU unit 107 determines that the print control apparatus 201 has not yet transferred a power supply state notification (NO in step S813), the processing proceeds to step S814. In step S814, the CPU unit 107 activates only a process that is needed to transfer the power supply state notification, performs end processing on other processes, and the processing proceeds to step S815.

In step S814, the CPU unit 107 may determine again whether the power supply state notification has reached the upper limit of transfer performed in step S802. In the present exemplary embodiment, step S814 is performed because the printing system including the print control apparatus 201 and the image forming apparatus 207 is intended to be terminated as quickly as possible. Step S814 may be omitted if the printing system need not be quickly terminated.

In step S815, the CPU unit 107 instructs the image forming apparatus 207 to transmit a power supply state notification. Receiving the instruction to transmit a power supply state notification, the image forming apparatus 207 may immediately transmit a power supply state notification, or may restart the processing from step S502. If the image forming apparatus 207 has already been terminated when the instruction to transmit a power supply state notification is issued, the print control apparatus 201 may issue a power supply state notification instead and the processing may proceed to step S816. Alternatively, the processing may simply proceed to step S816.

Having instructed the image forming apparatus 207 to transmit a power supply state notification in step S815, the processing proceeds to step S805. In step S805, the CPU unit 107 waits for a power supply state notification. While the present exemplary embodiment has dealt with a power supply state notification first, a remote end notification may be received first.

Consequently, the print control apparatus 201 can perform control to restrict the start of the shutdown processing after a power supply state received from the image forming apparatus 207 is notified to the data processing apparatus 211 until a remote end notification is received from the image forming apparatus 207.

Figure 11:
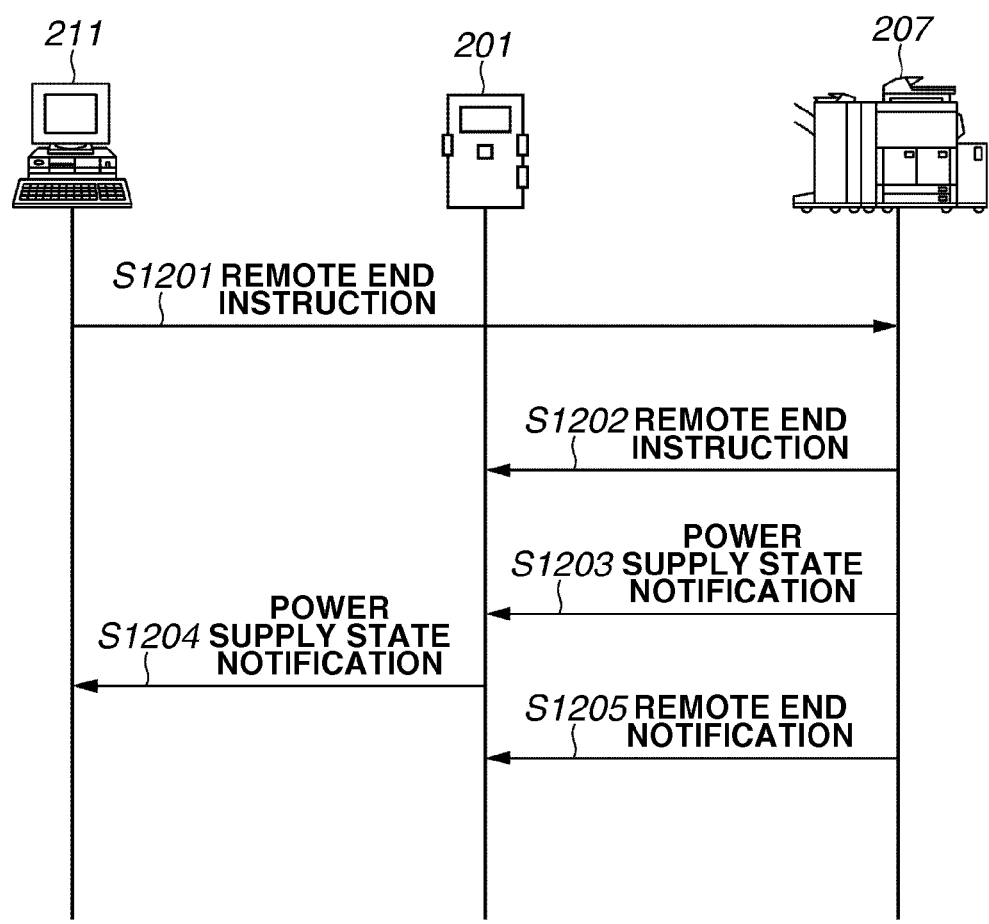
FIG. 11 is a diagram illustrating a second power supply control sequence of a printing system according to a third exemplary embodiment.

FIG. 11 is a diagram illustrating a sequence example of a printing system according to a third exemplary embodiment. Steps S1201 to S1205 represent instructions or notifications.

In step S1201, the data processing apparatus 211 issues a remote end instruction to the image forming apparatus 207. The print control apparatus 201 receives the remote end instruction, and transfers this packet to the image forming apparatus 207. In step S1202, the image forming apparatus 207 receives the remote end instruction, and issues a remote end instruction to the print control apparatus 201. In step S1203, the image forming apparatus 207 receives the remote end instruction, starts remote end processing, and transmits a power supply state notification to the data processing apparatus 211.

In step S1204, the print control apparatus 201 receives the power supply state notification, and transmits the power supply state notification to the data processing apparatus 211. In step S1205, the image forming apparatus 207 transmits a remote end notification to the print control apparatus 201. Transmitting the remote end notification, the image forming apparatus 207 turns off the switch 310 of the image forming apparatus 207. In step S1205, the print control apparatus 201 receives the remote end notification, and powers off the print control apparatus 201.

Figure 12:
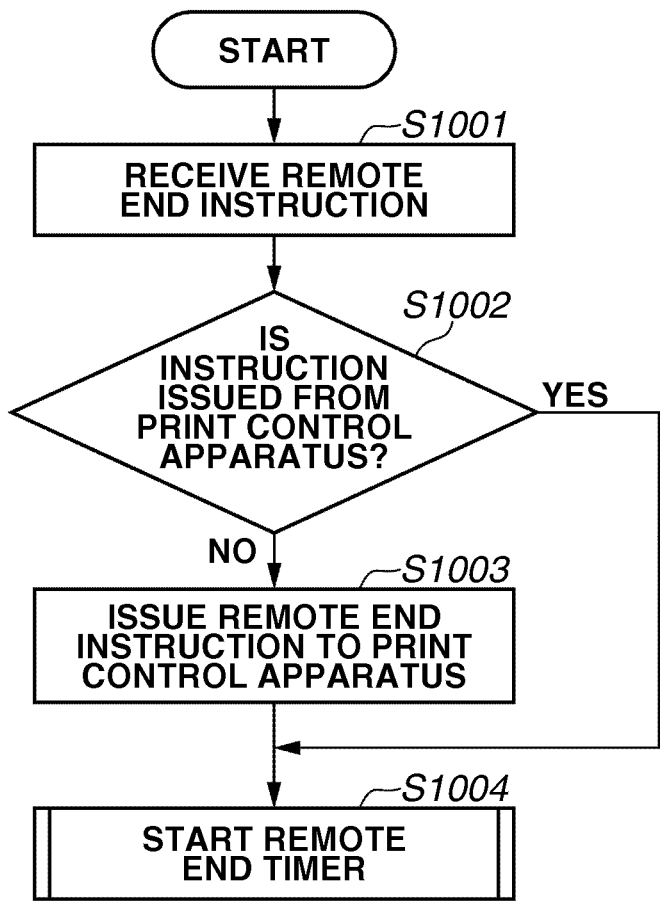
FIG. 12 is a flowchart illustrating a method for controlling an image forming apparatus (printing apparatus) according to the present exemplary embodiment.
Figure 13:
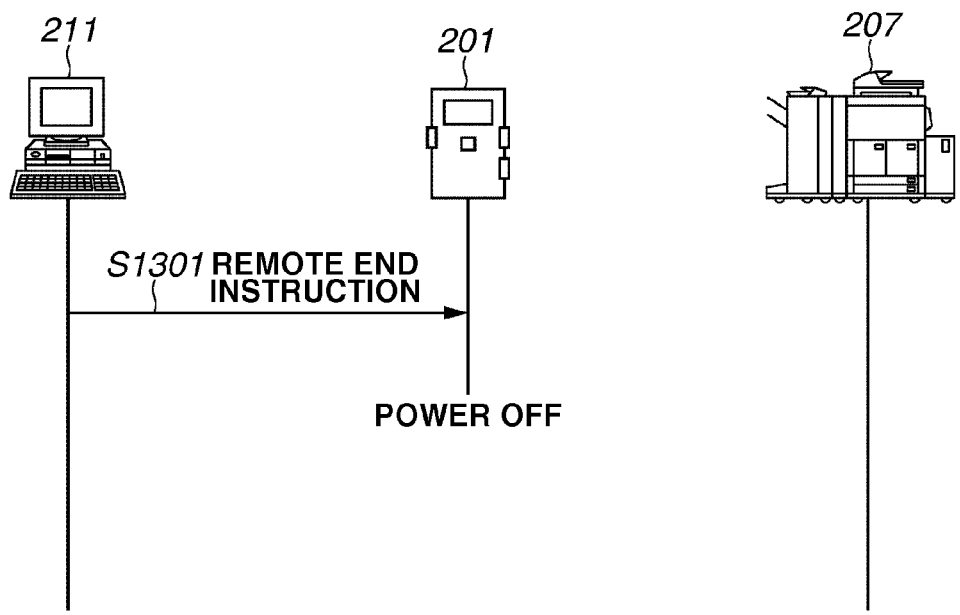
FIG. 13 is a diagram illustrating a power supply control sequence example of a printing system.
Figure 14:
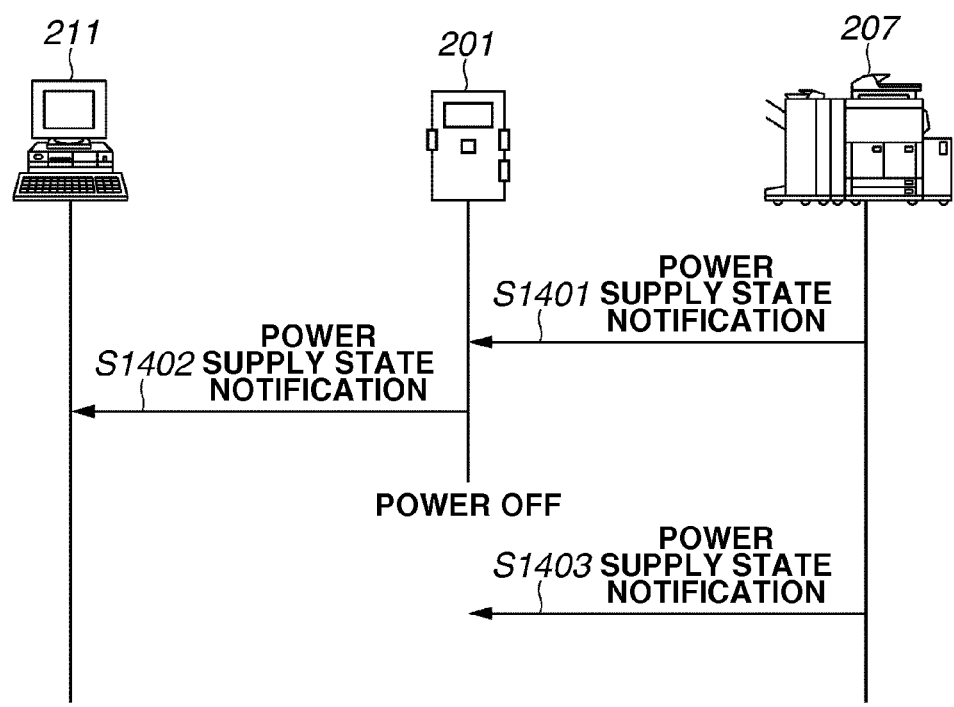
FIG. 14 is a diagram illustrating a power supply control sequence example of a printing system.

FIG. 12 is a flow chart illustrating a method for controlling the image forming apparatus 207 according to the present exemplary embodiment. This example deals with an example of processing between when the data processing apparatus 211 transmits a remote end instruction to the image forming apparatus 207 and the image forming apparatus 207 receives the instruction and when a remote end timer is started. The processing after the start of the remote end timer is similar to that of the first exemplary embodiment. The description thereof is omitted.

The following steps are executed and implemented by the CPU 308A of the control unit 308 of the image forming apparatus 207 according to a program stored in the ROM 308B of the control unit 308.

In step S1001, the data processing apparatus 211 transmits a remote end instruction to the image forming apparatus 207. The print control apparatus 201 receives the packet of the remote end instruction transmitted from the information processing apparatus 211 through the LAN 212. Receiving the packet, the print control apparatus 201 transfers the packet to the image forming apparatus 207. The CPU unit 107 of the print control apparatus 201 determines whether the remote end instruction is directed to the image forming apparatus 207 or the print control apparatus 201 by using a Transmission Control Protocol (TCP) or User Datagram Protocol (UDP) port number. As another example, the CPU unit 107 may make the determination based on a MIB object or a value written in the MIB object. When the image forming apparatus 207 receives a remote end instruction, the processing proceeds to step S1002.

In step S1002, the CPU 308A of the image forming apparatus 207 determines whether the remote end instruction is the one issued from the print control apparatus 201. If the CPU 308A determines that the remote end instruction is issued from the print control apparatus 201 (YES in step S1002), the processing proceeds to step S1004.

On the other hand, if the CPU 308A determines that the remote end instruction is not issued from the print control apparatus 201 (NO in step S1002), the processing proceeds to step S1003. In step S1003, the CPU 308A issues a remote end instruction to the print control apparatus 201, and the processing proceeds to step S1004. The processing of step S1004 and subsequent steps is similar to that of the first and second exemplary embodiments. A description thereof is omitted.

In step S1002, the CPU 308A determines whether the remote end instruction is the one issued from the print control apparatus 201 based on a transmission source address or port number of the remote end instruction. The CPU unit 107 of the print control apparatus 201 may determine whether the remote end instruction is received from the image forming apparatus 207, and quit transmitting a remote end instruction to the image forming apparatus 207.

Consequently, the print control apparatus 201 can restrict the start of the shutdown processing until a remote end notification is received from the image forming apparatus 207.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A printing system comprising:
a print control apparatus; and
a printing apparatus,
wherein the print control apparatus includes a CPU circuit and memory, wherein the CPU circuit of the print control apparatus executes instructions in the memory, the CPU circuit causing the print control apparatus to perform the functions of:
a first communication unit that communicates with an external device on a network;
a second communication unit that communicates with the printing apparatus; and
a first shutdown unit that executes first shutdown processing for turning off a power supply of the print control apparatus,
wherein in a case where the first communication unit has received a shutdown instruction from the network, the second communication unit instructs the printing apparatus to turn off a power supply of the printing apparatus,
wherein the printing apparatus includes a control unit comprising a second CPU circuit and second memory, the control unit, through the second CPU circuit, loads instructions stored in the second memory, causing the printing apparatus to perform the functions of:
a third communication unit that communicates with the print control apparatus; and
a second shutdown unit that executes, in a case where the print control apparatus has instructed the printing apparatus to turn off the power supply of the printing apparatus, second shutdown processing for turning off the power supply of the printing apparatus,
wherein the second shutdown processing includes a plurality of processes,
wherein in a case where a part of the plurality of processes is completed, the third communication unit transmits an end notification to the print control apparatus,
wherein in a case where the second communication unit has received the end notification from the printing apparatus, the first shutdown unit executes the first shutdown processing,
wherein in a case where the second communication unit has received a power supply state notification from the printing apparatus, the first communication unit transmits the power supply state notification to the network, and after the first communication unit transmits the power supply state notification to the network, the printing control apparatus determines if the end notification has been received from the third communication unit, and if the end notification has not been received, the second communication unit transmits an instruction to the printing apparatus to transmit the end notification, and
wherein the power supply to the print control apparatus is maintained after the second communication unit receives the power supply state notification until the second communication unit receives the end notification.

2. The printing system according to claim 1,
wherein the plurality of processes includes at least application end processing and OS end processing, and
wherein in a case where the application end processing is completed, the third communication unit transmits the end notification to the print control apparatus.

3. The printing system according to claim 2,
wherein after the application end processing is completed, the second shutdown unit starts the OS end processing.

4. The printing system according to claim 1,
wherein an attribute value of the power supply state notification indicates that a power supply of the printing apparatus is off.

* * * * *